United States Patent Office 2,965,644
Patented Dec. 20, 1960

2,965,644

DYESTUFFS OF THE NAPHTHOYLENE-ARYL-IMIDAZOL-PERI-DICARBOXYLIC ACID SERIES

Wilhelm Eckert and Otto Fuchs, Frankfurt am Main, and Wilhelm Happe, Schwalbach (Taunus), Germany, assignors to Farbwerke Hoechst Aktiengesellschaft vormals Meister Lucius & Brüning, Frankfurt am Main, Germany, a corporation of Germany No Drawing. Filed Feb. 11, 1958, Ser. No. 714,471

Claims priority, application Germany Feb. 16, 1957

6 Claims. (Cl. 260—282)

The present invention relates to valuable new dyestuffs of the naphtoylene-arylimidazol-peri-dicarboxylic acid series and to a process of preparing the same; more particularly it relates to dyestuffs corresponding to the following general formula

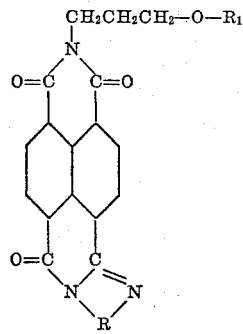

wherein R represents a substituted or unsubstituted arylene radical and $R_1$ represents a low-membered branched or straight-chained alkyl group.

According to the statements in German Patent No. 547,924 naphthoylene-arylimidazol-peri-dicarboxylic acids or the anhydrides thereof can be condensed with compounds of the type $R_1$—$NH_2$, in which $R_1$ represents hydrogen, an alkyl, aryl, aralkyl, hydroaryl group or a substituted or unsubstituted amino group. The vat dyestuffs so obtained correspond to the following general formula

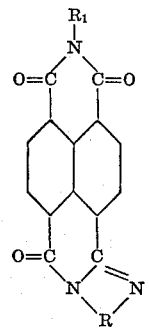

wherein R stands for a substituted or unsubstituted arylene radical and $R_1$ has the meaning indicated above. The dyestuffs can be used for dyeing fibers or foils of polyesters, especially of polyethylene glycol terephthalates, from an aqueous suspension and possess on these materials very good properties of fastness.

Now we have found that the affinity of these dyestuffs for polyester fibers can be considerably increased, when the radical $R_1$ of the amine is substituted by an alkoxy group. The process can be carried out by condensing naphthoylene-arylimidazol-peri-dicarboxylic acids or their anhydrides in an organic solvent or in water with compounds of the type X—$NH_2$, in which X stands for a trimethylene chain substituted by an alkoxy group. Compounds of the type X—$NH_2$ are for example 2-methoxy-propylamine, 2-ethoxy-propylamine, 2-isopropoxy-propylamine and 2-butoxy-propylamine. The dyestuffs so obtained correspond to the following general formula

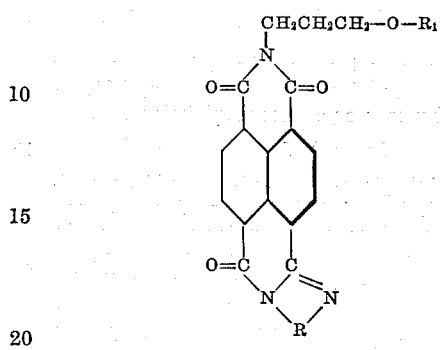

wherein R means a substituted or unsubstituted arylene radical and $R_1$ represents a low-membered branched or straight-chained alkyl group.

The new dyestuffs dye fibers or foils of polyesters considerably deeper tints than the dyestuffs disclosed in German Patent No. 547,924. The dyeings can be produced from an aqueous suspension at about 100° C. in the presence of a carrier, such as o-phenylphenol or tetrahydronaphthalene, or at temperatures above 100° C. under pressure without the addition of a carrier.

Before the dyeing operation the dyestuffs are advantageously finely dispersed according to known methods by grinding them with a dispersing agent in a roller or oscillating mill or according to another method.

The following examples serve to illustrate the invention, but they are not intended to limit it thereto, the parts being by weight unless otherwise stated and the relationship of parts by weight to parts by volume being the same as that of the kilogram to the liter.

Example 1

258 parts of naphthoylene-4'-chloro-benzimidazol-peri-dicarboxylic anhydride are suspended in 1000 parts by volume of water, 10 parts of glacial acetic acid and 68 parts of 3-methoxy-propylamine are added and the mixture is heated in a pressure vessel for 6 hours at 130–140° C. After cooling the reaction product is filtered off with suction and washed well with water. The dyestuff which is obtained in the form of fine yellow crystals dyes fibers of polyesters, especially of polyethylene glycol terephthalates, vivid golden-yellow tints of excellent properties of fastness. It corresponds to the following formula

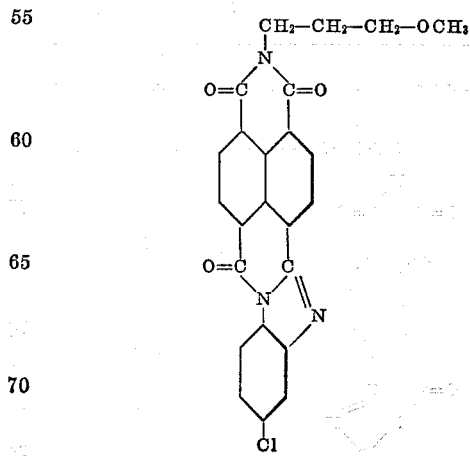

Example 2

300 parts of naphthoylene-4'-cyano-benzimidazol-peri-dicarboxylic anhydride and 90 parts of 3-ethoxy-propylamine are heated at the boil for 2 hours in 2500 parts by volume of pyridine. On cooling the dyestuff separates in the form of fine yellow little crystals. It is filtered off with suction, washed with methanol and dried. In a finely dispersed form the dyestuff dyes fibers of polyesters brilliant greenish yellow tints of very good properties of fastness.

The pyridine used as solvent can be replaced by other inert solvents, such as picoline, quinoline, o-dichlorobenzene, trichlorobenzene or α-chloronaphthalene.

Example 3

354 parts of naphthoylene-4'-methyl-benzimidazol-peri-dicarboxylic anhydride and 120 parts of 3-isopropoxy-propylamine are heated under reflux for some hours in 5000 parts by volume of water. After cooling the reaction product is filtered off with suction, washed well with water and dried. The dystuff so obtained dyes polyester fibers vivid golden-orange tints of very good properties of fastness.

The following table indicates a number of further dyestuffs which can be obtained by the process of this invention and also the tints of the dyeings produced with these dyestuffs on polyester fibers, which likewise possess good properties of fastness:

TABLE

| naphthoylene-arylimidazol-peri-dicarboxylic acid or its anhydride | condensed with | tint |
|---|---|---|
| 1. naphthoylene-benzimidazol-peri-dicarboxylic acid or its anhydride. | 3-methoxy-propylamine. | golden-yellow. |
| 2. naphthoylene-4'-chloro-benzimidazol-peri-dicarboxylic acid or its anhydride. | 3-ethoxy-propylamine. | Do. |
| 3. naphthoylene-4'-chloro-benzimidazol-peri-dicarboxylic acid or its anhydride. | 3-isopropoxy-propylamine. | Do. |
| 4. naphthoylene-4'-cyano-benzimidazol-peri-dicarboxylic acid or its anhydride. | 3-methoxy-propylamine. | greenish yellow. |
| 5. naphthoylene-4'-cyano-benzimidazol-peri-dicarboxylic acid or its anhydride. | 3-n-butoxy-propylamine. | Do. |
| 6. naphthoylene-4'-methyl-benzimidazol-peri-dicarboxylic acid or its anhydride. | 3-methoxy-propylamine. | golden-orange. |
| 7. naphthoylene-4'-methyl-benzimidazol-peri-dicarboxylic acid or its anhydride. | 3-ethoxy-propylamine. | Do. |
| 8. naphthoylene-4'-methyl-benzimidazol-peri-dicarboxylic acid or its anhydride. | 3-n-butoxy-propylamine. | Do. |
| 9. naphthoylene-4'-methoxy-benzimidazol-peri-dicarboxylic acid or its anhydride. | 3-methoxy-propylamine. | red-brown. |
| 10. naphthoylene-4'-isopropoxy-benzimidazol-peri-dicarboxylic acid or its anhydride. | ----do------- | Do. |
| 11. naphthoylene-4'-isopropoxy-benzimidazol-peri-dicarboxylic acid or its anhydride. | 3-isopropoxy-propylamine. | Do. |
| 12. naphthoylene-4'-isopropoxy-benzimidazol-peri-dicarboxylic acid or its anhydride. | 3-n-butoxy-propylamine. | Do. |

We claim:
1. Dyestuffs which correspond to the following general formula

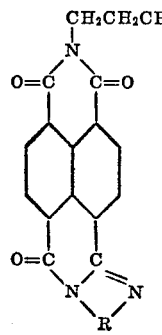

wherein R represents a member selected from the group consisting of phenylene, chloro-phenylene, cyano-phenylene, methyl-phenylene, methoxy-phenylene and propoxy-phenylene, and $R_1$ represents a lower alkyl group.

2. The dyestuff which corresponds to the following formula

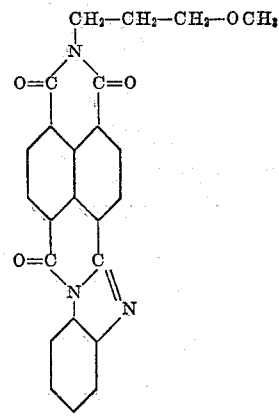

3. The dyestuff which corresponds to the following formula

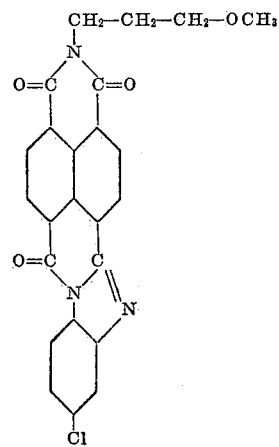

4. The dyestuff which corresponds to the following formula

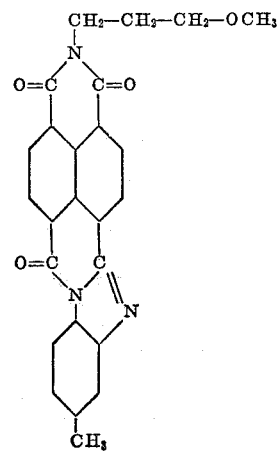

5. The dyestuff which corresponds to the following formula
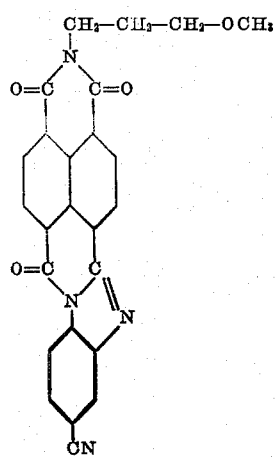
6. The dyestuff which corresponds to the following formula
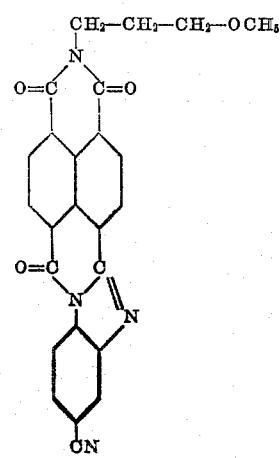
References Cited in the file of this patent
UNITED STATES PATENTS
1,935,945   Eckert _____ Nov. 21, 1933
FOREIGN PATENTS
301,173   Italy _____ Sept. 28, 1932